US012769762B2

(12) United States Patent
Garg et al.

(10) Patent No.: US 12,769,762 B2
(45) Date of Patent: Oct. 20, 2026

(54) DYNAMIC LOADING OF STATELESS NODE HIERARCHY

(71) Applicant: Oracle International Corporation, Redwood Shores, CA (US)

(72) Inventors: Anurag Garg, Cupertino, CA (US); Jeffrey Leon Woodard, Winter Garden, FL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/033,847

(22) Filed: Jan. 22, 2025

(65) Prior Publication Data

US 2026/0211900 A1 Jul. 23, 2026

(51) Int. Cl.

*G06F 16/00* (2019.01)
*G06F 9/451* (2018.01)
*G06F 16/28* (2019.01)

(52) U.S. Cl.

CPC ............ *G06F 16/282* (2019.01); *G06F 9/451* (2018.02)

(58) Field of Classification Search

CPC ...... G06F 16/182; G06F 16/185; G06F 16/21; G06F 16/2246; G06F 16/436; G06F 16/221; G06F 16/2428; G06F 16/248; G06F 16/26; G06F 16/282; G06F 16/289; G06F 16/532; G06F 16/56; G06F 16/5866; G06F 16/904; G06F 16/951; G06F 3/0482; G06F 3/04842; G06F 3/04845; G06F 8/70; G06F 9/451; G06F 3/017; G06F 40/30; G06F 3/011; G06F 3/167; G06F 16/285; G06F 16/29; G06F 8/34

See application file for complete search history.

(56) References Cited

U.S. PATENT DOCUMENTS

| | | | | |
|---|---|---|---|---|
| 2016/0307237 | A1* | 10/2016 | Glover | G06Q 30/0251 |
| 2020/0234152 | A1* | 7/2020 | Ares | G06F 16/21 |

* cited by examiner

*Primary Examiner* — Shyue Jiunn Hwa
(74) *Attorney, Agent, or Firm* — Invoke

(57) ABSTRACT

Techniques for dynamically loading and displaying hierarchical data are disclosed. A system selectively loads node data from a datastore storing a node hierarchy by determining if a particular node meets a display criterion and corresponds to an expanded node state. If a system determines that the node meets the display criterion but corresponds to a collapsed node state, the system refrains from loading the node data from the data store to a local cache. If the system determines the node corresponds to the expanded node state but does not meet the display criterion, the system does not load the node data from the datastore to the local cache.

20 Claims, 9 Drawing Sheets

DYNAMIC LOADING OF STATELESS NODE HIERARCHY

TECHNICAL FIELD

The present disclosure relates to managing hierarchical data. Specifically, this disclosure relates to storage and retrieval of hierarchal data.

BACKGROUND

Various approaches exist for browsing data maintained by a remote machine. When browsing small sets of remote data, a browser may be able to download and cache the entire dataset at the beginning of browsing, so no further data retrieval is necessary during the browsing session. However, with some datasets having on the order of a million entries, the entire dataset may be too large to fit in a local cache. Even if the dataset fits in a local cache, retrieving the entire dataset when only a small portion of the dataset is to be accessed may be inefficient. For example, retrieving the entire dataset may consume more network bandwidth and processor cycles than retrieving only the desired portion. In addition, loading data as the user scrolls down does not allow any area of the hierarchy to be displayed without first loading the preceding nodes. For example, in a multi-paragraph document, the first paragraph would need to be loaded before displaying the second paragraph, both the first and second paragraphs would need to be loaded before displaying the third paragraph, and so on.

Some approaches use fetching and cache management strategies to access data stored locally that has been retrieved from remotely stored datasets. For example, a browser may provide a scrolling interface for browsing "linear" data. As used herein, "linear data" refers to data items that have a relative ordering, such as chronological, alphabetical, or numerical. The relative ordering indicates which data items are logically adjacent to each other. A list of data may be displayed according to the data items' relative ordering.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
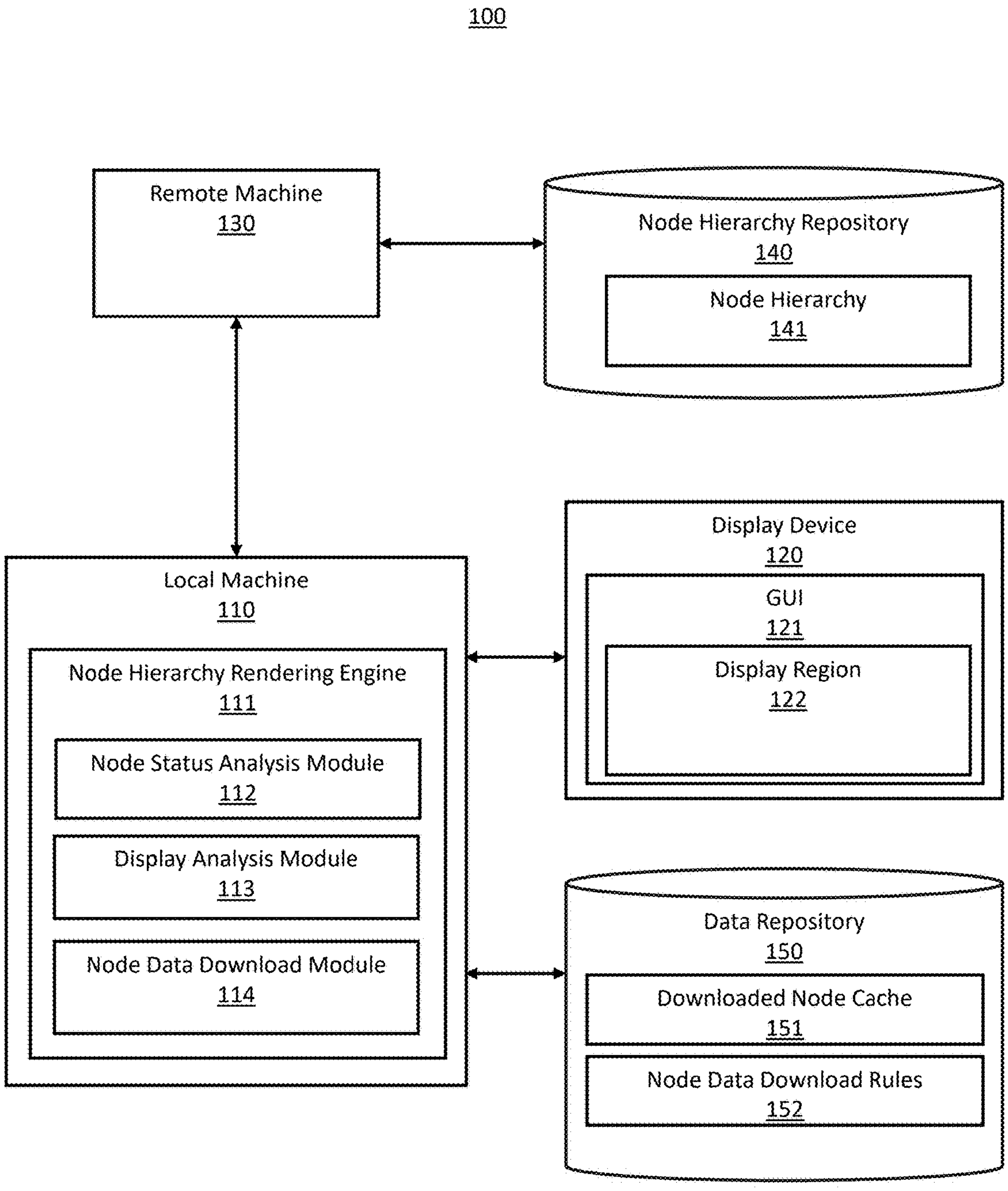
FIG. 1A illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. HIERARCHICAL DATA DISPLAY AND RETRIEVAL ARCHITECTURE
3. DYNAMIC RETRIEVAL AND DISPLAY OF HIERARCHICAL DATA
4. NODE HIERARCHY USER INTERFACE
5. EXAMPLE EMBODIMENT
6. COMPUTER NETWORKS AND CLOUD NETWORKS
7. HARDWARE OVERVIEW
8. MISCELLANEOUS; EXTENSIONS

1. GENERAL OVERVIEW

One or more embodiments improve the performance of a system in which a datastore that stores hierarchical data (potentially including thousands or hundreds of thousands of nodes) is implemented remotely from a browser or other component that displays a visual representation of the hierarchical data. Based on a command to make a set of nodes conditionally visible to a user (e.g., an "expanded" portion of a node hierarchy), one or more embodiments download, from a datastore, a subset of the set of nodes. A system applies a set of rules to determine the subset of nodes to download and store in a local cache. The rules are based on a display region of a client device and an expand/collapse state of nodes. Node state data specifies if a node, or its parent node, is in an "expand" state or a "collapse" state.

In an embodiment, a user interface displaying a node hierarchy may collapse a hierarchy of nodes or expand the hierarchy of nodes based on receiving commands from a user interacting with the user interface. Collapsing a node hierarchy conditionally hides the nodes, preventing users from selecting the nodes. Expanding the node hierarchy displays the nodes, allowing users to select the nodes. In a hierarchy including large numbers of nodes, expanding a hierarchy may affect more nodes than fit within a display region of a hierarchy display. One or more embodiments selectively request and locally store node data from a remote datastore by determining, for each node, if the node meets a display criterion and if the node is subject to a command to expand a node hierarchy. If a system determines that a node is subject to a command to expand a node hierarchy but the node does not meet the display criterion, the system does not load the node data from a datastore or display the node in a hierarchy display. Likewise, if the system determines a node meets the display criterion but is not subject to a command to expand a node hierarchy, the system does not load the node data.

One or more embodiments re-check a node's eligibility for loading node data and display, based on changes to display data. For example, a user may scroll down a node hierarchy. A node that was not within a display region may fall within the display region after the user's scrolling. If the system determines that the node meets the display criteria, such as falling within the display region, and the node is subject to an "expand" command, the system loads the node data from the storage server.

One or more embodiments determine a collapse/expand state of node based on determining that the collapse/expand state of the node, or a parent node, that is lowest on the node hierarchy. For example, a source node of a hierarchy may be subject to an "expand all" command that would result in every node in the node hierarchy being visible and selectable by a user. However, a node that is three hierarchal levels down from the source node may be subject to a "collapse" command. A target node may be in a fifth hierarchal level of the node hierarchy. In this example, the system traverses the node state commands until the system determines that the target node is subject to the "collapse" command. The system may then refrain from analyzing further commands corresponding to nodes higher on the node hierarchy.

Some embodiments described in this Specification and/or recited in the claims may not be included in this General Overview section.

2. HIERARCHICAL DATA DISPLAY AND RETRIEVAL ARCHITECTURE

In an embodiment, a tree browser allows a user to browse hierarchical data. In an embodiment in which nodes from a hierarchy are displayed in an ordered sequence in a display window, the ordered sequence is determined by traversing the hierarchy in a particular search order. For example, in an embodiment, the ordered sequence may be generated by following these rules starting with a particular node A in the hierarchy:

(a) start with an empty sequence, and start at a particular node in the hierarchy such as node A;
(b) add the particular node to the sequence;
(c) if the particular node has one or more child nodes and the particular node is in an expanded state, then
(d) perform steps (b) and (c) for each of the child nodes of the particular node in order of the child nodes. (This is a recursive algorithm in which a child node becomes the particular node when performing steps b and c).

The ordering produced by these rules results in a linearization of the hierarchy similar to the way many file system contents are displayed to a user, with the containing folder or directory first, then a list of contents in the directory including files and other directories. The nodes in the ordered sequence may be affected by an expansion status of a node. When a parent node is expanded, the child nodes of that parent node appear in the ordered sequence of nodes. When the parent node is collapsed, the child nodes do not appear.

In addition to scrolling through an ordered list of data representing a hierarchy (tree) of nodes, a tree browser may also allow for a user to expand or collapse a node of the tree. When a user expands a node in the display, the display changes by inserting child nodes into the ordered list shown in the display. Inserting nodes in the middle of the displayed list may push nodes that appear toward the bottom of the list off the bottom end of the display. The position of a node displayed to a user relative to other nodes on a screen may change based on the expansion of nodes in the hierarchy. Thus, the set of nodes to be displayed depends on the expansion state of nodes related to the particular node.

A hierarchical data browser may fetch data from a remote machine that includes all the nodes in a subtree of the hierarchy. The hierarchical data browser may then only display nodes requested by the user; that is, a browser may fetch a fully expanded subtree. Alternatively, the browser may fetch a subset of the fully expanded subtree such as a set of descendant nodes extending two hierarchical levels from a target node. In such an example, descendant nodes in a third hierarchical level from the target node are not fetched by the browser.

FIG. 1A illustrates a system 100 in accordance with one or more embodiments. As illustrated in FIG. 1, system 100 includes a local machine 110, a display device 120 coupled to the local machine 110, a remote machine 130, a node hierarchy repository 140 and a data repository 150. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

A node hierarchy 141 represents a very large dataset of hierarchical data. For example, the dataset may include tens of thousands, hundreds of thousands, or millions of nodes. The storage space required to store the node hierarchy 141 may exceed a capacity of the data repository 150. Additionally, or alternatively, storing the node hierarchy 141 in the data repository 150 may adversely affect operations of the local machine 110, including operations to retrieve and display portions of the node hierarchy 141 in the graphical user interface (GUI) 121.

The node hierarchy 141 is stored in the node hierarchy repository 140. The node hierarchy 141 is browsable by a node hierarchy rendering engine 111 in a local machine 110. The nodes in the node hierarchy 141 are sent upon request to the local machine 110. The local machine 110 is accessible by users to browse the node hierarchy 141 by displaying the node hierarchy 141 on a display device 120. The hierarchy includes the nodes. In one embodiment, the remote machine 130 is a server that handles requests from the local machine 110 to retrieve node hierarchy data from the node hierarchy repository 140. In one embodiment, the remote machine 160 does not store state information to track the data that is being browsed or cached by one or more browsing machines such as the local machine 110.

The remote machine 130 manages the node hierarchy 141. Requests for nodes are received by remote machine 130 to fetch data from the node hierarchy 141. The data from the node hierarchy 141 is sent to the requesting machine such as local machine 110. The remote machine 130 may be stateless with regard to the data being requested. That is, the remote machine 130 does not maintain a record of past requests. The request for data to the remote machine 130 is idempotent.

In an embodiment, the remote machine 130 and the local machine 110 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, and a proxy server. In one embodiment, the remote machine 130 includes a server, and the local machine 110 includes a desktop computer.

Display device 120 includes a display screen or other display mechanism. The display device 120 is coupled to the local machine 110 to display node hierarchy data. The display device 120 displays a graphical user interface GUI 121. The GUI 121 includes interface elements, including text, graphics, and images. The GUI 121 may present data representing the node hierarchy 141 with shapes representing nodes and text representing node properties. Display region 122 includes a display window in a region of the GUI 121. The GUI 121 displays an ordered list of data items of hierarchical tree nodes of the node hierarchy 141. Users interact with the ordered list of data items to browse the node hierarchy 141. The ordered list of data items includes a number of data items according to the number of lines of data that can be displayed concurrently in the display region 122.

The GUI 121 may display multiple display regions. For example, one display region may display node properties of a selected node. Another, concurrently-displayed display region may display metadata for the selected node. Examples of metadata include an ordered list of ancestor nodes in the hierarchy for a selected node. Other information that may be displayed in display regions include attributes of a selected node, such as value and type, creation time, owner, etc. In addition, the GUI 121 may display a search interface in a display region.

The local machine 110 hosts a browser used by a user to browse the data in the node hierarchy 141. A user views nodes in the display region 122. The user may navigate by scrolling to other nodes in an ordered list of nodes. As scrolling introduces new nodes into the display region 122, the local machine 110 may request that the remote machine 130 send the to-be-displayed nodes to local machine 110 to be displayed in the display region 122. A user may interact with display region 122 to specify a target node for viewing. For example, the display region 122 may include a list of bookmarked nodes, recently viewed nodes, or a search bar for specifying the name of the target node. In response to the user requesting to view a particular target node, local machine 110 may determine nodes next to the target node. The local machine 110 may fetch those additional nodes from remote machine 130 together with the target node.

Repository 150 stores a downloaded node cache 151. The downloaded node cache 151 is a cache local to, and managed by, the local machine 110. The local machine 110 stores copies of a subset of the nodes from the node hierarchy 141 as the nodes are fetched from the remote machine 130. For every requested node in the local cache 151, the cache may include copies of ancestors, siblings, descendants, or other types of related nodes as specified in a policy. Policies specifying rules for downloading nodes and node data from the node hierarchy 141 are stored in node data download rules 152. As an example, for every requested node in the local cache 151, the cache may include all ancestors of the requested node, but the cache may not necessarily include all the sibling nodes of the requested nodes. In another example, for every requested node in the local cache, the cache may include ancestor nodes, up to n levels up, and all the sibling nodes of the requested nodes. In addition to the data in the nodes that are copied in the cache, cached nodes may also include additional metadata that tracks the browsing state of the data in the browser. This metadata may not be known to the remote machine 130 storing the master node hierarchy 141. For example, each internal node (that is, nodes having at least one child node) may have an associated expansion status indicator. The expansion status indicates if child nodes of an internal node are to be displayed. In an embodiment, the downloaded node cache 151 may also store a list of nodes for which the expansion status is expanded. This list of expanded nodes may be separate from the cached nodes, and the list may persist in the cache even when a node in the list may be deleted from the cache. In an embodiment, the expanded node list may be restricted to including those nodes that have been cached at least once during the browsing session and whose expansion status is expanded. Nodes that have not yet been cached during the browsing session and nodes having a collapsed status may not be in the list. Alternatively, the list of expanded nodes may be further restricted to nodes that have been evicted by the cache having an expanded status. In such an embodiment, a node may be added to the list of expanded nodes when an expanded node is evicted from the cache. When a node that has been previously evicted from the cache is re-fetched and stored in the cache, its expansion status may be set to expanded if the node appears in the list of nodes with expansion status. In an embodiment, a node may be removed from the list of expanded nodes when the node is stored in the cache because the node's expansion state is stored within the cached node itself.

In an embodiment in which the nodes of the node hierarchy 141 are ordered according to the linearization rules described above, child nodes of a particular expanded internal node may appear in an ordered list of nodes before a sibling node of the particular internal node. However, if the particular node has an expansion status of "collapsed", the sibling node may appear immediately after the particular node without intervening child nodes.

Some of the nodes in the node hierarchy 141 may not have corresponding copies in the cache 151. A placeholder may be used to represent a set of contiguous ordered nodes to indicate that the master node hierarchy 141 includes nodes that are not represented in the cache 151. When traversing the cached hierarchy for nodes to display in an ordered sequence, encountering a placeholder may cause the local machine 110 to request copies of the missing nodes from the remote machine 130 and to enter the fetched nodes into the cache 151.

Figure 1B:
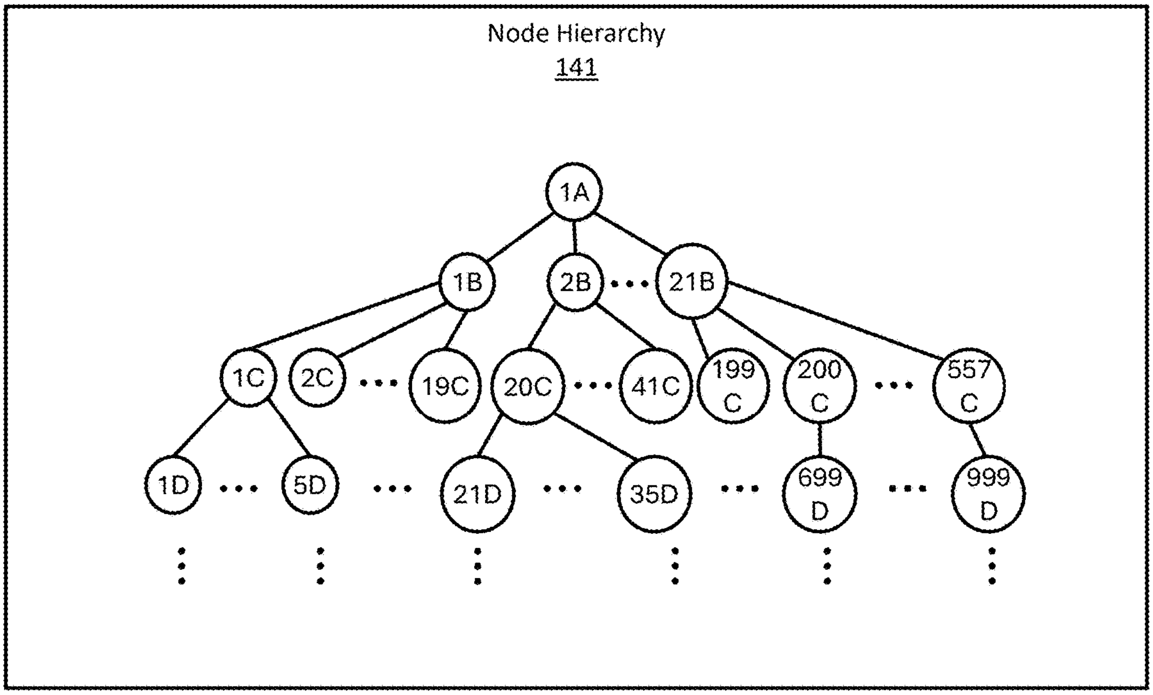
FIG. 1B illustrates a node hierarchy in accordance with one or more embodiments.

FIG. 1B illustrates node hierarchy 141 in more detail in accordance with one or more embodiments. In the illustrated example, the labels of the nodes in the hierarchy are selected to facilitate identifying nodes. The illustrated example should not be construed to limit the scope of any of the claims. Each node has a unique identity when using the labels of its ancestors as a prefix. For example, the number in the node is an indication of the order of sibling nodes. Thus, a node with "1" is the first sibling node, and a node with "2" is the second sibling node. The letter in the node indicates the level in the hierarchy. Thus, node 1B is a descendent of node 1A. Node 1A is the root of the hierarchy and has 21 child nodes in order {1B, 2B, . . . , 21B}. The ellipses in the diagram indicate nodes that exist in the hierarchy, but representation has been left out of the diagram for lack of space. For example, node 1B has child nodes 1C, 2C, 3C, 4C, 5C, 6C, etc., up to node 19C. Child nodes 3C, 4C, 5C, 6C, etc. are not depicted in the figure. Nodes 1B, 2B, and 21B each have child nodes as well. This hierarchy has a very large number of nodes, where a very large number includes at least tens of thousands of nodes and may include millions of nodes or more. In one or more embodiments, the size of the node hierarchy 141 is sufficiently large, so downloading the node hierarchy 141 to the repository 150 and maintaining the node hierarchy 141 by the local machine 110 would adversely affect performance of the local machine 110. For example, rendering portions of the node hierarchy 141 in the display region 122 by the node hierarchy rendering engine 111 would consume processing resources exceeding predefined performance specifications if the local machine 110 maintained the node hierarchy 141 in the repository 150.

In one or more embodiments, a data repository 150 is any type of storage unit and/or device (e.g., a file system, database, collection of tables, or any other storage mechanism) for storing data. Furthermore, a data repository 150 may include multiple different storage units and/or devices. The multiple different storage units and/or devices may or may not be of the same type or located at the same physical site. Furthermore, a data repository 150 may be implemented or executed on the same computing system as the local machine 110 and/or the remote machine 130. Additionally, or alternatively, a data repository 150 may be implemented or executed on a computing system separate from the local machine 110 and/or the remote machine 130. The data repository 150 may be communicatively coupled to the local machine 110 via a direct connection or via a network.

Information describing the downloaded node cache 151 and the node data download rules 152 may be implemented across any of components within the system 100. However, this information is illustrated within the data repository 150 for purposes of clarity and explanation.

Returning to FIG. 1A, the node hierarchy rendering engine 111 includes a node status analysis module 112, a display analysis module 113, and a node data download module 114. The node status analysis module 112 determines an expanded/collapsed property of a node. The node status analysis module 112 may analyze expand/collapse data associated with stored nodes. The expand/collapse data may be stored separately for each node. For example, an "expand" command on node 1B may apply to nodes 1C-6C, 1D-45D, and 1E-99E. The local machine 110 may store separate metadata associated with individual nodes specifying expanded/collapsed states of the nodes. Alternatively, the system may store expand/collapse instructions separately from node data. When analyzing a node to determine whether or not to retrieve node data from the remote machine 130, the system may analyze the stored instructions to determine the expanded/collapsed node state of the node.

In one embodiment, the local machine 110 stores expand/collapse commands in order of path segment length. For example, a path segment length of an expand/collapse command applied to node 1A in FIG. 1B is 1. A path segment length of an expand/collapse command applied to node 2B in FIG. 1B is 2 (1A/2B). A path segment length of an expand/collapse command applied to node 41C in FIG. 1B is 3 (1A/2B/41C). A path segment length of an expand/collapse command applied to node 133D in FIG. 1B is 4 (1A/21B/60C/133D). The local machine 110 stores the expand/collapse commands in order of path segment length from 1 to 4 in the above examples.

When a user interacts with the GUI 121 to perform a scrolling operation in the display region 122, the node status analysis module 112 (*a*) identifies a node affected by the scrolling operation and (b) identifies an expand/collapse command that applies to the closest ancestor node (i.e., the ancestor node with the longest path segment).

The display analysis module 113 analyzes display data associated with the display region 122 in the GUI 121 to determine nodes associated with the display region 122. Nodes associated with the display region 122 include (a) nodes presently displayed in the display region, (b) parent, child, and sibling nodes within a predefined distance of nodes presently displayed in the display region, and (c) nodes affected by scrolling operations initiated by a user to scroll through a displayed node hierarchy in the display region 122. For example, the display analysis module 113 may determine that based on a scrolling operation, a display region 122 is scrolling from node 19C, illustrated in FIG. 1B, toward node 20C.

The node data download module 114 applies a set of node data download rules 152 based on (a) node display data and (b) node collapse/expand state data to determine a set of nodes to be requested from the node hierarchy 141 via the remote machine 130 to be stored in the downloaded node cache 151.

In one or more embodiments, the node hierarchy rendering engine 111 refers to hardware and/or software configured to perform operations described herein for selectively retrieving and storing displayed hierarchal data. Examples of operations for selectively retrieving and storing displayed hierarchal data are described below with reference to FIG. 2.

3. DYNAMIC RETRIEVAL AND DISPLAY OF HIERARCHICAL DATA

Figure 2:
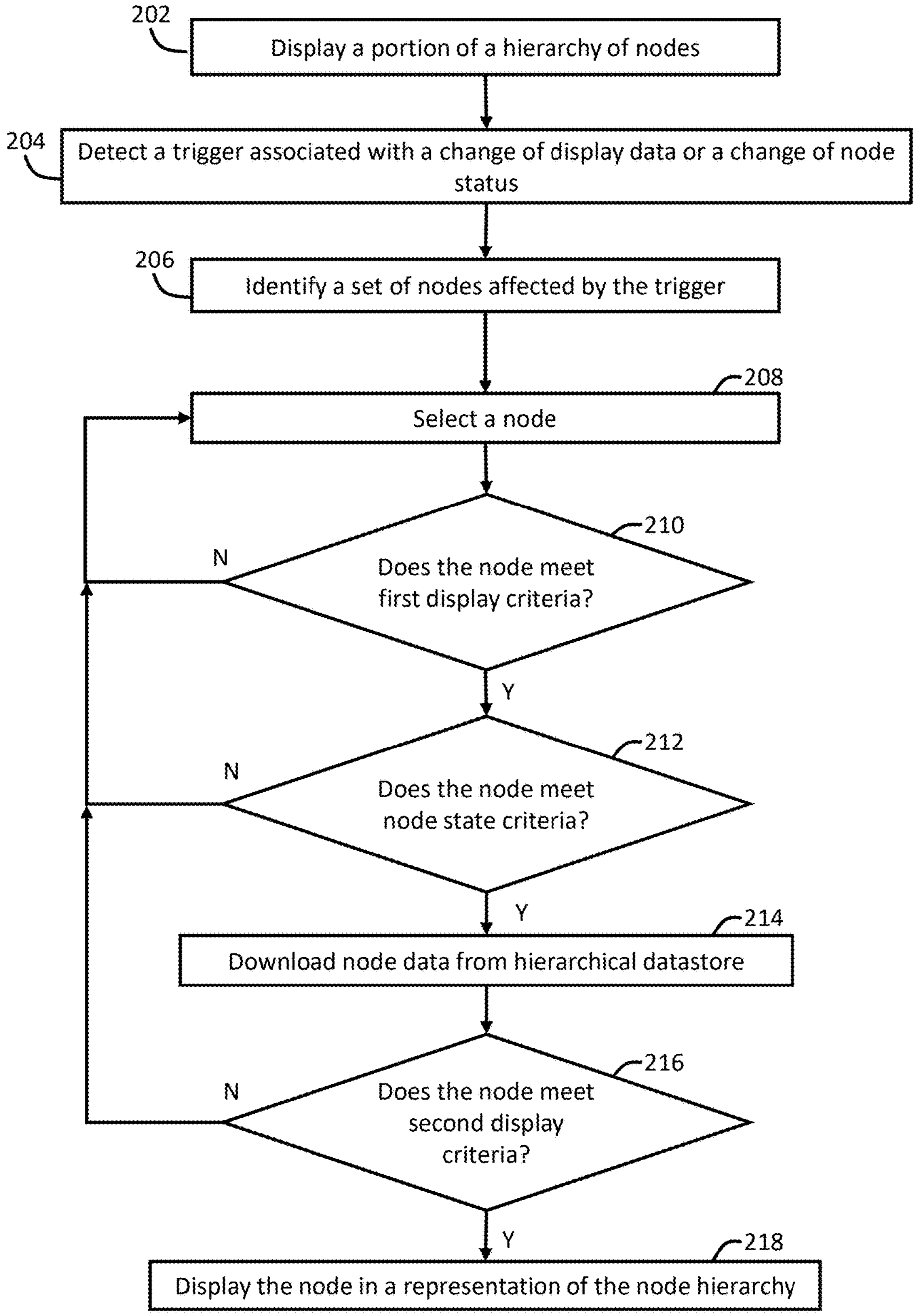
FIG. 2 illustrates an example set of operations for selectively retrieving and storing hierarchical data based on a display in accordance with one or more embodiments.

FIG. 2 illustrates an example set of operations for dynamically retrieving and displaying hierarchical data in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, a system displays a portion of a hierarchy of nodes in a display region of a GUI displayed on a display device (Operation 202). A set of nodes that is displayed in the display region is a subset of the nodes in the node hierarchy. For example, a node hierarchy may include 1,000,000 nodes, and the system may display ten nodes in a display region. The nodes are displayed as an ordered sequence of nodes in the display region. For example, the system may arrange the nodes spatially within the display region to signify parent/child relationships among the nodes. In an embodiment, a local machine managing a display device for displaying nodes may pre-fetch some portion of a node hierarchy for display in a display region.

The system detects a trigger associated with a change of display data or a change of node status (Operation 204). For example, the system may detect a scrolling operation associated with a display region. The scrolling operation may result in one or more nodes moving out of a display region. Conversely, the scrolling operation may result in one or more nodes moving into the display region. In an embodiment, spatial relationships among nodes in a display region represent parent/child and sibling relationships among nodes in a node hierarchy. In this embodiment, the system determines from the scrolling operation a set of nodes that is affected by the scrolling. For example, the system may determine, based on a left-right scrolling operation, that a sibling node of a presently-displayed node is to be displayed in the display region. The system may further determine that the sibling node is within n nodes of a presently displayed node. As another example, based on an up-down scrolling operation, the system may determine that a descendant node of a presently displayed node is within n nodes of a presently-displayed node.

In one or more embodiments, a trigger includes user-generated instructions to expand or collapse a subset of the node hierarchy. Expanding a subset of the node hierarchy includes changing the nodes from a non-displayed state to a conditional displayed state. A conditional displayed state means if the node is in a display region of a GUI, the GUI displays the node. The non-displayed state means that the GUI would not display the node even if the GUI would have displayed the node if the node was in the expanded state. When a display region includes an expanded node, the node is visible in the display region. When a display region includes a collapsed node, the node is not displayed in the display region.

In one or more embodiments, a trigger may further include modifications to a node hierarchy. Modifications include adding nodes, removing nodes, and changing parent/child relationships among nodes. For example, a user may drag one node from a child position beneath a first parent node to a child position beneath a second parent node. Additionally, or alternatively, a user may create a new child node of an existing node. Dragging a tree of nodes from one portion of the display region to another may result in one or more new nodes being included in the display area. In one or more embodiments, dragging a node from a parent node associated with an expand instruction to a parent node associated with a collapse instruction changes the node status of the dragged node from expanded to collapsed. Alternatively, dragging the node to the parent node associated with collapse instruction may apply an "expand one child" instruction to parent node to apply an expanded node status to the dragged node without changing a collapsed state of additional child nodes.

According to an example, a user may request to view a particular node in the hierarchy that is not shown in a display region of a GUI. For example, a target node of interest to the user may be located in a subtree that is multiple levels above or below a displayed node hierarchy. A portion of the GUI may present a set of bookmarked nodes or recently viewed nodes that a user may select.

In one or more embodiments, a trigger may further include a user specifying a target node. For example, a user may enter a node identifier in a search field of a GUI. Node identifiers may include, for example, node names, unique node identifiers, and node properties. A user may enter query terms, including node properties and attributes, to select a subset of nodes for viewing in the GUI. The subset of nodes may include non-contiguous sets of nodes.

The system identifies a set of nodes affected by the trigger (Operation 206). When the trigger includes a scrolling operation, the system identifies one or more nodes that are adjacent to a presently displayed node in the direction of the scrolling operation. For example, if the trigger is an up-down direction scroll operation, the system identifies descendent nodes of the presently displayed nodes. In an example where the trigger includes an expand/collapse command, the system identifies descendent nodes of a target node to be expanded and collapsed. In yet another example where the trigger includes a user selecting a particular target node, the system identifies a predefined set of nodes associated with the target node, such as ancestor nodes, descendant nodes, and sibling nodes of the target node.

The system selects a target node for analysis to determine whether or not to download the target node (Operation 208). In some examples, the target node is specified by a user. For example, when a user enters a node identifier into a search field of a GUI, the system selects the corresponding node as the target node. In an example where the set of nodes affected by a trigger includes two or more nodes, the system selects nodes one at a time for sequential analysis.

The system determines if the node meets a first display criterion (Operation 210). The first display criterion includes a determination that the node has a predetermined relationship with one or more nodes presently displayed in the display region of the GUI. For example, the system may determine that the node is a child node of a presently displayed node. The system may determine that the node is a sibling node of a presently displayed node. The system may determine that the node is n nodes away from a presently displayed node. In one example, n represents one hierarchical level or a sibling relationship. In another example, n represents a combination of hierarchical levels and sibling relationships. For example, if a second-level node 1B is displayed in a display region of a GUI, a set of nodes n nodes away from node 1B may include three child nodes, 1C, 2C, and 3C, from among one hundred child nodes of node 1B. The set of nodes n nodes away from node 1B may further include one sibling node 2B and one parent node 1A.

If the target node does not meet the first display criterion, the system selects another node for analysis (Operation 208). For example, a node 244C in a node hierarchy may be a child node of a displayed node 2B that is affected when a user selects node 2B as a target node. However, the system may determine that child nodes 1C, 2C, 3C, and 4C of displayed node 2B meet the first display criterion. Additional child nodes 5C-244C of the displayed node 2B may fail to meet the first display criterion.

If the target node meets the first display criterion, the system determines if the node meets a nodes state criterion (Operation 212). Determining if the target node meets the node state criterion includes determining if the node is in an "expanded" state. In one embodiment, determining that the node is in the expanded state includes (a) traversing upward along the hierarchal data structure from the target node to ancestor nodes and (b) for each ancestor node, determining if an instruction exists to expand or contract descendant nodes of the ancestor node.

Based on identifying an ancestor node that corresponds to an instruction to collapse its descendent nodes, the system determines that the target node does not meet the node state criterion (Operation 212, N). The system stops traversing the node hierarchy.

Based on identifying an ancestor node that corresponds to an instruction to expand its descendent nodes, the system determines that the target node meets the node state criterion (Operation 212, Y). The system stops traversing the node hierarchy.

In one or more embodiments, the system determines if a target node meets the node state criterion by identifying an expand/collapse instruction associated with an ancestor node of the target node with the longest node path from an apex of the node hierarchy. In other words, the system determines if a target node meets the node state criterion by identifying an expand/collapse instruction associated with an ancestor node of the target node that is at the lowest hierarchical level in the node hierarchy. By identifying the expand/collapse state of the ancestor node lowest in the node hierarchy, the system does not analyze expand/collapse instructions based on the order they were received.

For example, a system may generate an instruction to expand descendent nodes from node 4C. Subsequently, the system may generate an instruction to collapse descendent nodes from node 1B, which is a descendent node of node 4C. The system may subsequently receive additional instructions to expand and collapse portions of the node hierarchy that do not descend from node 1B. Based on the instruction to collapse descendent nodes from node 1B, the system deletes the instruction to expand the descendent nodes from node 4C. Accordingly, if the system later traverses the node hierarchy from a descendent node 11D to node 4C, the system does not encounter any instruction associated with node 4C. The system continues to traverse the node hierarchy to node 1B. Upon identifying the instruction to collapse the descendent nodes from node 1B, the system stops traversing the node hierarchy.

Based on determining both (a) the target node meets the first display criterion and (b) the target node meets the node state criterion, the system downloads node data for the target node from a hierarchical datastore (Operation 214). For example, a first node may meet the first display criterion by being within n nodes of a displayed node. The first node may also be in an expanded state. Accordingly, the system downloads node data associated with the first node. Conversely, a second node may meet the first display criterion by being within n nodes of the displayed nodes. However, the second node may be in a collapsed state. Accordingly, the system refrains from downloading node data associated with the second node.

In one embodiment, a local machine stores a subset of nodes of a larger node hierarchy. The larger node hierarchy is stored in a remote database accessed via a remote server. Based on determining that a target node meets the first display criterion and the node state criterion, the local machine may search for the target node in a local cache. If the target node is not stored in the local cache, the local machine may request a copy of the target node from the remote machine. The local machine then stores the copy of the target node in the cache. In addition, ancestors of the target node that are not already in the cache may be fetched and placed in the cache. The ancestors to be fetched may be determined by applying predefined rules. Similarly, siblings of the target node may be fetched and stored in the cache. The ancestor nodes and sibling nodes to be fetched and stored in the cache may be determined based on the first display criteria. For example, the display criteria may specify nodes located within n hierarchical levels of a target node. The display criteria may further specify nodes within m horizontal positions of the target node to identify sibling nodes to be retrieved and cached.

The system further determines if the target node meets a second display criterion (Operation 216). The second display criterion may be a determination that a node is located within a display region of a GUI. If the system determines the target node does not meet the second display criterion, the system selects a next node in the set of nodes for analysis.

If the system determines the target node meets the second display criterion, the system displays the target node in a representation of the node hierarchy in a display region of the GUI (Operation 218). The system determines the number of data items to be displayed in a display region of a GUI based on a display configuration. The display configuration may include, for example, the size of the display window, the resolution of the display window, the size of each illustration of a node, and the amount of space between nodes.

According to one example, a system may be configured to display up to five ancestors of a target node, two siblings of the target node, and no descendants. The five ancestor nodes may be determined by traversing up to five levels from the target node in the node hierarchy. The two siblings may be determined based on the position of the target node in an ordered sequence of siblings. The two nodes following the target node in an ordered sequence of siblings may be identified as the siblings to be displayed. Displaying no descendants initially means that the system is configured to initially display target nodes in a collapsed state. An alternate configuration may apply an expanded state to a target node. As an example, the first x descendants in an ordered sequence of descendants of the requested node may be included with an initial display of the requested node.

In an embodiment, the system identifies the nodes to be displayed when a particular displayed node is expanded. In response to the request to expand a particular node, the system determines the number of descendant nodes that are to be displayed. As an example, the system may be configured to initially display the first four descendant nodes without displaying other descendant nodes of the expanded node. A display of the other descendant nodes may be triggered by a user scrolling down the list of descendant nodes.

The nodes to be displayed, as explained above, are limited to a specific number of nodes based on a configuration associated with a display window. As an example, the number of nodes that can be displayed in a window may be a function of a size and/or resolution of the window, a size of an icon representing each node within the window, a font size of a node identifier, and/or a spacing between nodes. The system may determine, for example, that ten nodes can be displayed with a requested node. Based on a priority and/or policy, the system may select ten nodes of the nodes related to the requested node as the to-be-displayed nodes.

In one or more embodiments, when a system determines a set of nodes is affected by a trigger but does not meet the first display criterion and the node state criterion, the system may store placeholders for the set of nodes in the local cache without storing the nodes themselves. A placeholder may include a node identifier and data specifying relationships among the nodes without storing the content of the nodes.

Node placeholders may represent individual nodes or a contiguous set of nodes that exist in a remote data repository but are not stored in the cache. Based on determining that a target node meets a display criterion and a node state criterion and is not yet stored in the cache, the system may generate a request to a server to fetch a node represented by a placeholder. The system replaces the placeholder in the cache with the fetched node.

In an embodiment, if a user selects a node to display by entering an identifier of the selected node in a search interface, the selected node may reside in a subtree that has not yet been cached and/or expanded. Thus, when a selected node is randomly accessed, each of the ancestor nodes' expansion states may be set to expanded. Child nodes that were recently expanded, but not yet represented in the cache, may be fetched and cached or may be represented by a placeholder until those child nodes are determined to be needed for display.

4. NODE HIERARCHY USER INTERFACE

A system may utilize a browser to support a user's ability to select nodes in a node hierarchy, scroll among views of nodes, and expand or collapse sets of nodes.

In one embodiment, the expansion state of a node entering the cache may be set to a default value. For example, the default expansion state may be set to not expanded (also referred to herein as collapsed). A user may request expansion of a node by choosing (e.g. clicking on) the node in a display window. When a user chooses an individual node to be expanded, the node's expansion state indicator value may be set to expanded, and the child nodes of the selected node may be added into the displayed list of nodes subject to display constraints such as an amount of viewable area available in the display region. The expansion state indicator may remain as expanded until the user requests the node to be collapsed. In one or more embodiments, the system determines whether or not to request expanded descendent nodes from a remote server to be cached in a local cache based on the operations described above in FIG. 2.

In an embodiment, a user may request to expand all; this changes the expansion state of all nodes in the hierarchy to expanded. Upon expanding all nodes in the hierarchy, the browsing state may be changed for all nodes, not just the nodes that are being displayed or cached at the time the request is made. In an embodiment, a global expansion state indicator may indicate if all nodes are to be displayed as expanded.

In an embodiment, a user may request to expand down; this may change the expansion state of all nodes in the subtree rooted at the chosen node to be expanded. In an embodiment, a subtree expansion indicator may be stored in the cache that identifies the node that is the root of the subtree to be expanded. To determine if a node to be displayed should be expanded, the system may consult the subtree expansion indicators to determine if the node is in the subtree of any of the nodes identified by the subtree expansion indicators.

Similarly, the user may request to collapse all, causing all nodes to become collapsed. The expansion state indicator may be set to collapsed, and a list of individual expanded nodes may be emptied. In an embodiment, subtree expansion indicators may be deleted.

5. EXAMPLE EMBODIMENT

A detailed example is described below for purposes of clarity. Components and/or operations described below should be understood as one specific example that may not be applicable to certain embodiments. Accordingly, components and/or operations described below should not be construed as limiting the scope of any of the claims.

FIGS. 3A-3E illustrate an example embodiment of dynamically retrieving and loading node data of nodes in a node hierarchy based on display criteria and node status criteria.

Figure 3A:
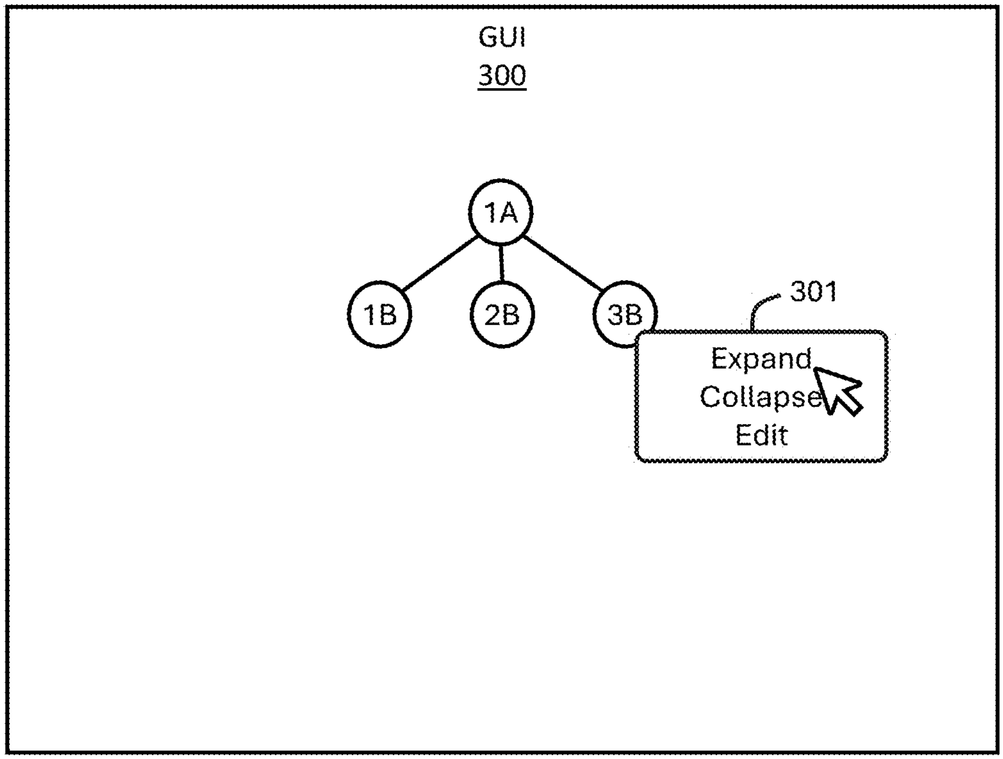
FIGS. 3A-3E illustrate an example embodiment.

FIG. 3A illustrates a GUI 300. The GUI 300 displays a subset of a node hierarchy. The entire node hierarchy is stored in a remote server. A local device presents the subset of the node hierarchy in the GUI 300. The local device dynamically requests copies of nodes stored in the remote server to be stored in local memory based on display data associated with the GUI 300 and based on an expanded/collapsed state of nodes.

The subset illustrated in FIG. 3A includes four nodes. Node 1A is a parent node. Nodes 1B, 2B, and 3B are child nodes of node 1A. Nodes 1B, 2B, and 3B are in a collapsed state, so the descendent nodes of nodes 1B, 2B, and 3B are not displayed in the GUI 300.

A user interacts with a command window 301 in the GUI 300 to generate an expand instruction to expand a portion of the node hierarchy, including descendent nodes of node 3B. The expanded/collapsed state of nodes is not communicated to the remote server. In other words, the remote server stores the node hierarchy in a stateless state. The expand/collapse instructions are instead managed by the local device that stores subsets of the node hierarchy in local memory. The combination of storing a stateless set of node hierarchy data and storing subsets of the node hierarchy in the local machine results in (a) improved node data retrieval times for retrieving node data from the remote server to the local machine and (b) improved node data presentation times for presenting node data to a user in a GUI 300. For example, managing node states by the remote server results in increased computation by the node server when a local device requests one or more nodes, resulting in degraded node data retrieval performance. In addition, locally storing an entire node hierarchy results in degraded user interface performance compared to locally storing subsets of the node hierarchy and dynamically retrieving subsets of node data from the remote server.

Figure 3B:
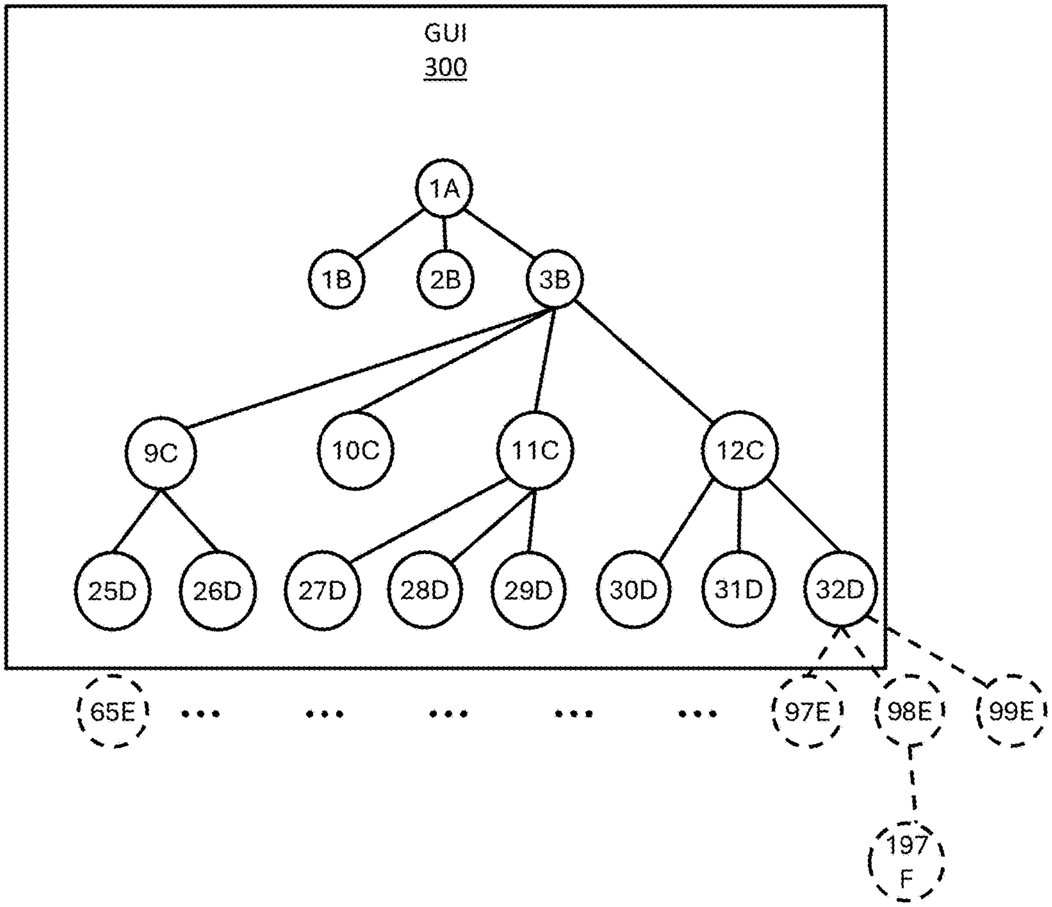

FIG. 3B illustrates a result of the expand instruction. The system determines that nodes 9C-12C and 25D-32D are within the display area of the GUI 300. Accordingly, the system searches local memory for node data for nodes 9C-12C and 25D-32D. Based on determining that the nodes (a) are within the display area of the GUI 300 and (b) are in an expanded state, the system requests node data from the remote server storing the complete node hierarchy for any of the nodes 9C-12C and 25D-32D that are not already stored in the local memory.

The system further applies a set of pre-fetch rules to determine whether or not to retrieve and store node data for additional nodes. For example, nodes 65E-99E are child nodes of nodes 25D-32D. Nodes 65E-99E are not within the display area of the GUI 300. However, the pre-fetch rules may specify that child nodes of nodes in the display area of the GUI 300 should be retrieved and stored in local memory. Accordingly, the system retrieves and stores node data for nodes 65E-99E based on determining (a) the nodes are child nodes of displayed nodes and (b) the nodes are in an expanded state.

Node 197F is a child node of node 98E. Node 197F is outside the display region. The pre-fetch rules may specify that only the child nodes of displayed nodes should be pre-fetched. Accordingly, the system may refrain from retrieving and storing node data for node 197F based on determining (a) node 197F is not a child node of a displayed node and (b) node 197F is in an expanded state.

Nodes 1B and 2B include child nodes in the node hierarchy stored in the remote server. The system may refrain from retrieving and storing node data for the child nodes of nodes 1B and 2B based on determining (a) the child nodes would be in the display area of the GUI 300 if they were expanded and (b) the child nodes are in a collapsed node state.

Figure 3C:
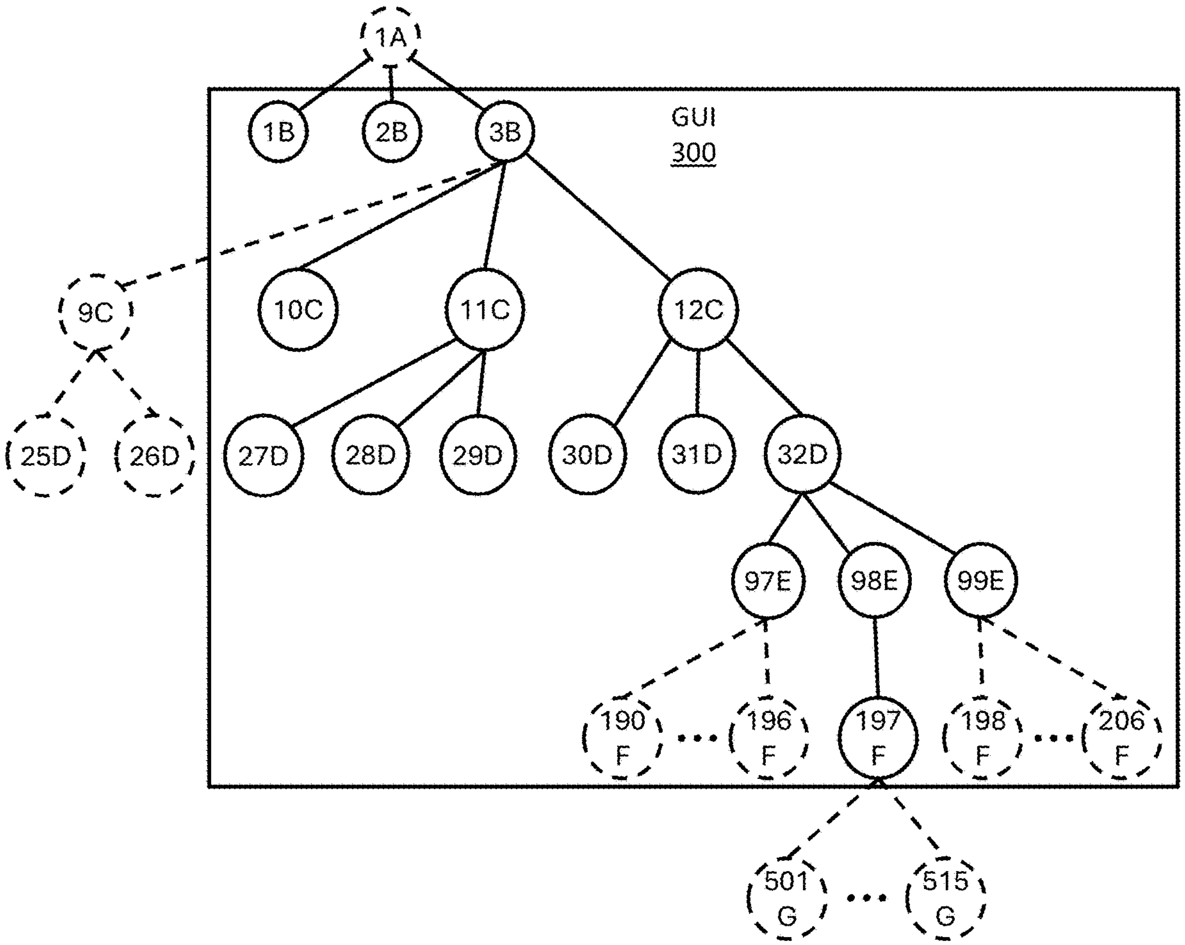

A user may select node 32D. In the example embodiment illustrated in FIGS. 3A-3E, selection of a node generates instructions to place sibling nodes that do not have displayed child nodes in a collapsed state. As a result, as illustrated in FIG. 3C, when a user initiates a scrolling operation to view additional nodes in the node hierarchy, the child nodes of nodes 27D-31D are not displayed in the GUI 300. In an alternative embodiment, the GUI 300 may display an interface element representing the set of child nodes of nodes 27D-31D. A user may interact with the interface element to view the child nodes in the GUI 300. According to yet another embodiment, selecting one node does not affect the display state of sibling nodes. In this embodiment, the system determines which sibling nodes of node 32D to present in the display area of the GUI 300 based on display constraints.

Based on the user-initiated scrolling operation, nodes 1A, 9C, 25D, and 26D are no longer in the display area of the GUI 300. However, the node data for these nodes remains stored in local memory. In the example embodiment illustrated in FIGS. 3A-3E, a command to expand a node generates an instruction to expand three descendent node hierarchy levels. The system generates instructions to collapse the nodes at the third node hierarchy level. Referring to FIG. 3C, nodes 97E, 98E, and 99E are initially in a collapsed state. A user may select node 98E to change node 98E from a collapsed state to an expanded state.

Nodes 190F-196F are child nodes of node 97E. The system refrains from fetching node data for nodes 190F-196F from the remote server based on determining (a) the nodes would be in the display area of the GUI 300 if expanded and (b) the nodes are in a collapsed node state. Similarly, the system refrains from fetching the node data for nodes 198F-206F from the remote server based on determining (a) the nodes would be in the display area of the GUI 300 if expanded and (b) the nodes are in a collapsed node state.

Based on the user selection of node 98E, the system places three descendent hierarchical levels from node 98E in the expanded state. Accordingly, nodes 501G-515G are child nodes of node 197F and are in the expanded state. In the embodiment illustrated in FIGS. 3A-3E, the system applies a pre-fetch rule directing the local device to pre-fetch nodes that are child nodes of a displayed node if the nodes are in an expanded state. The system fetches node data for nodes 501G-515G from the remote server based on determining (a) the nodes are child nodes of a displayed node 197F and (b) the nodes are in an expanded node state.

Figure 3D:
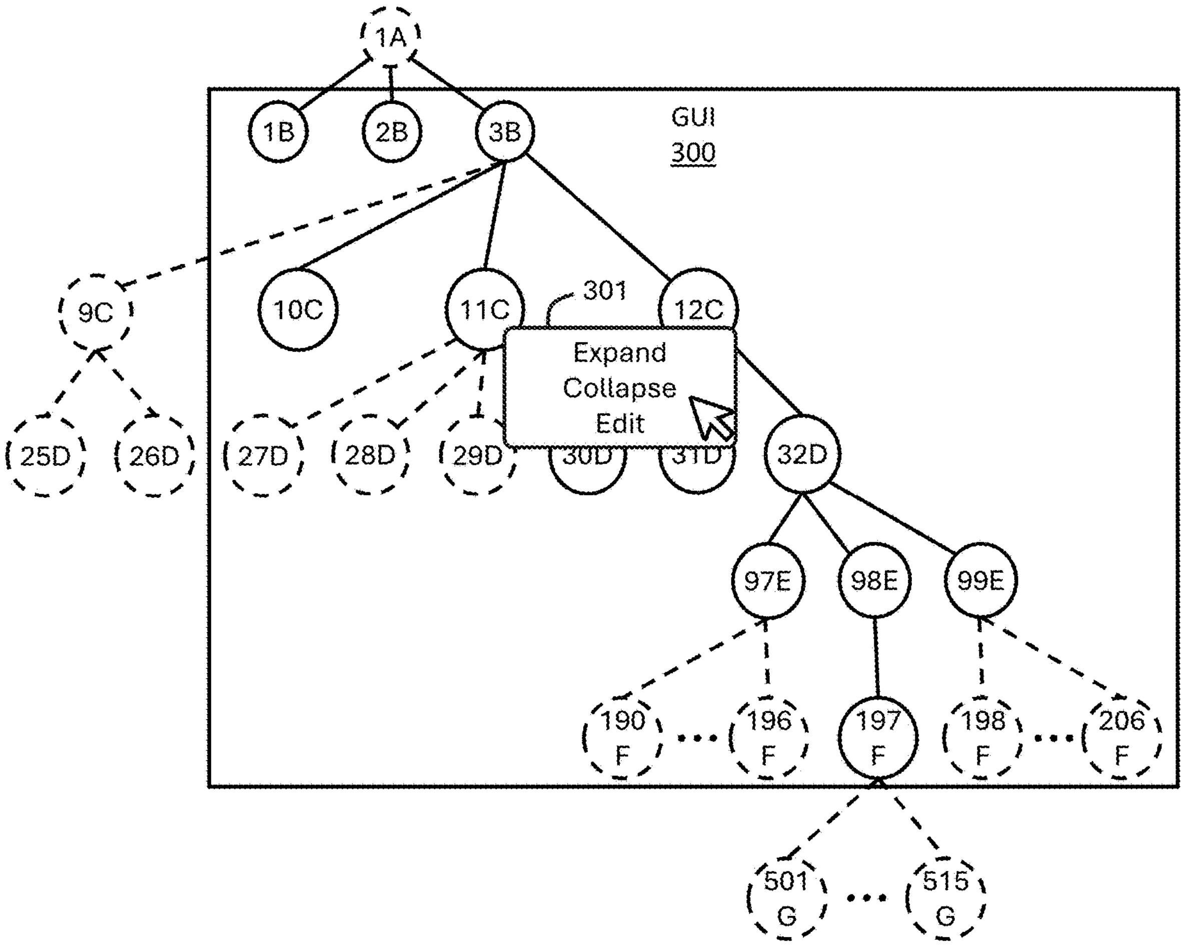

FIG. 3D illustrates user interaction with the command window 301 to collapse node 11C. As a result of the user-generated instruction, nodes 27D, 28D, and 29D are placed in a collapsed node state. The system does not display these nodes in the display area of the GUI 300. The node data for the nodes 27D, 28D, and 29D remains stored in the local memory.

Figure 3E:
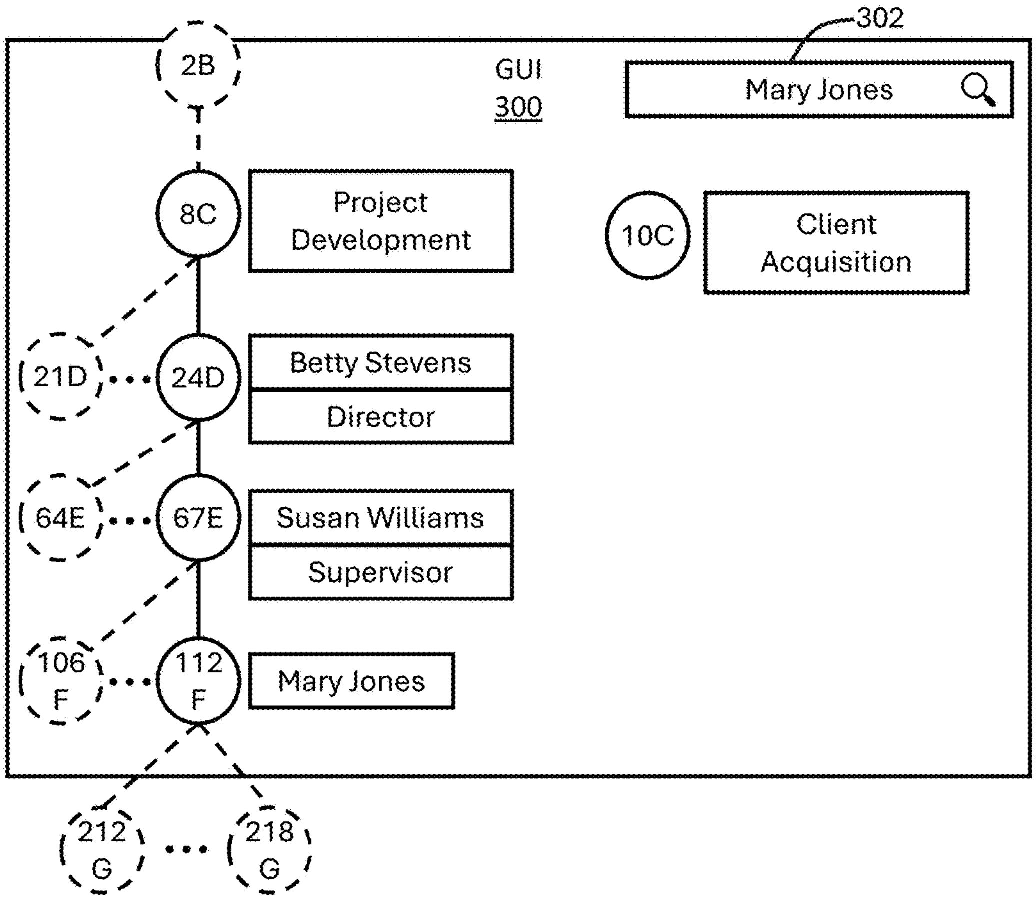

FIG. 3E illustrates an example of selecting a collapsed node for display in the GUI 300. A user enters a name, "Mary Jones," associated with a node 112F in a search field 302. The system searches node metadata to determine the node 112F corresponds to an employee "Mary Jones." The system determines that the node 112F is in a collapsed node state. For example, the node 112F is a descendent node of node 2B. Node 2B is associated with a collapse instruction. As a result, the descendent nodes of node 2B are in the collapsed node state.

The system implements a rule for presenting nodes that are in a collapsed node state. In the example embodiment, the rule specifies that the system should (a) change the node state of (i) the selected node and (ii) direct ancestor nodes of the selected node from collapsed to "expand one node." The rule may further specify that additional child nodes of these expanded nodes remain collapsed. Based on applying the rule, the system expands nodes 8C, 24D, 67E, and 112F. The system fetches node data for these nodes from the remote server based on determining that the nodes (a) are in the display area of the GUI 300 and (b) are in the expanded node state. Node 8C includes additional child nodes 21D-23D. The system refrains from fetching node data for these nodes from the remote server based on determining that the nodes (a) would be in the display area of the GUI 300 if expanded and (b) are in a collapsed state. The system further refrains from fetching node data for nodes 64E-66E and 106F-111F. The system may further present node properties associated with displayed nodes. The system presents the node names "Project Development," "Client Acquisition," "Betty Stevens, Director," "Susan Williams, Supervisor," and "Mary Jones" next to the corresponding nodes 8C, 10C, 24D, 67E, and 112F, respectively.

The system identifies nodes 212G-218G as being child nodes of the selected node 112F. The system applies a pre-fetching rule to determine whether or not to fetch node data for these nodes. In the example embodiment, the system refrains from pre-fetching node data for these nodes based on determining (a) the nodes are child nodes of a displayed node, and (b) the nodes are in a collapsed state. If a user subsequently changes node 112F from an "expand one node" state to an "expand descendants" state, the system re-determines whether or not to pre-fetch the node data for child nodes 212G-218G. Based on the re-determination, the system pre-fetches the node data for the child nodes 212G-218G based on determining (a) the nodes are child nodes of a displayed node, and (b) the nodes are in an expanded state.

Based on the above example embodiments, a system dynamically retrieves and presents node data for nodes in a node hierarchy based on user interactions with a user interface. The dynamic retrieval of the node data based on the user interactions implements rules that specify display criteria and node status criteria. In particular, the system applies rules that specify a relationship of a node to a display area of a GUI and if the nodes are in a collapsed or expanded state. Based on applying the rules, a local system selectively retrieves and stores subsets of node data from a remote server storing an entire node hierarchy.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users with the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users with the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
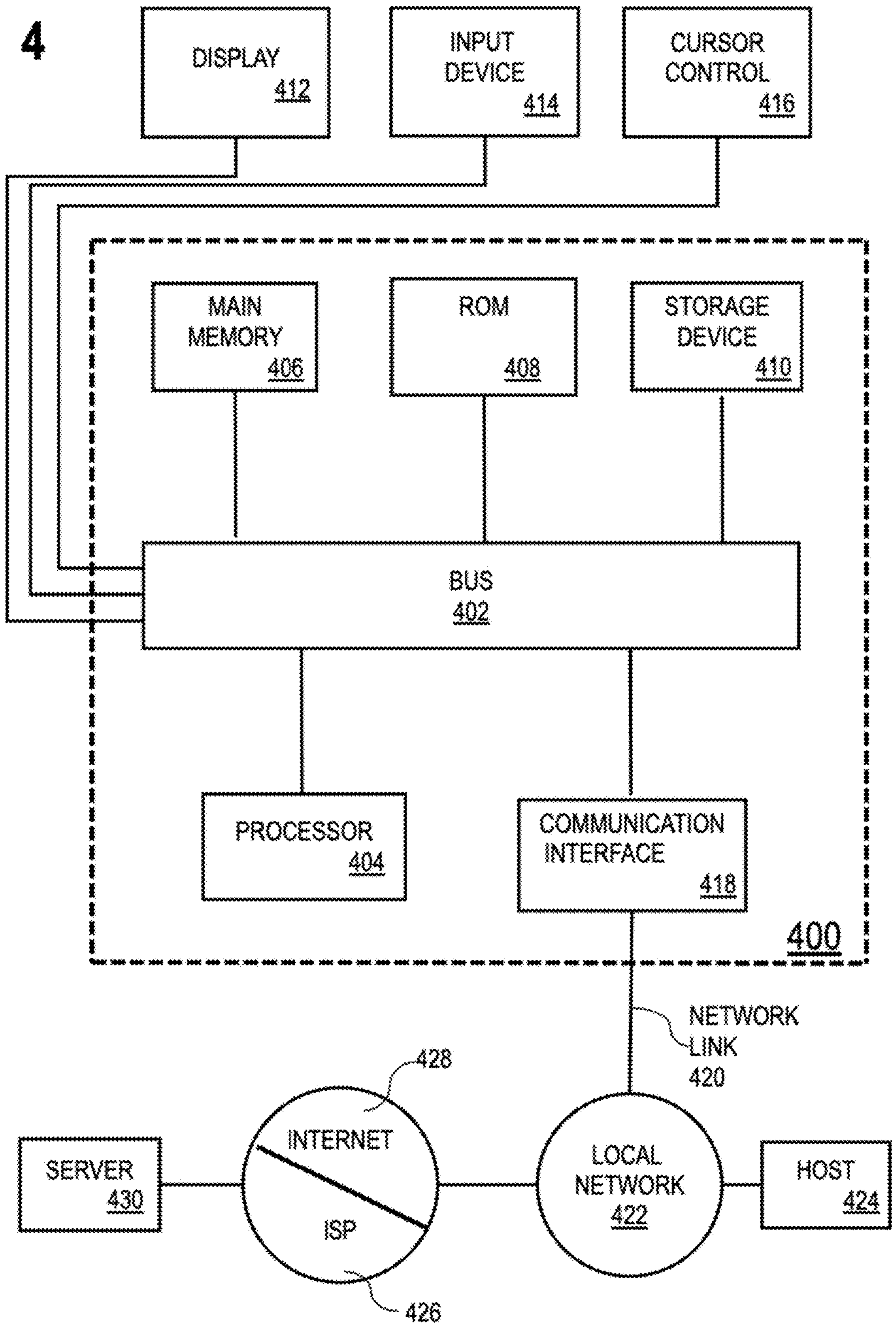
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

receiving, at a local device, a first instruction to change a node state of a first set of nodes in a hierarchal data structure, stored in a remote device, from a first state to a second state, wherein the first state corresponds to a non-user-selectable state and the second state corresponds to a user-selectable state;

determining that a first node (a) meets a node display criterion, and (b) is among the first set of nodes;

based on determining that the first node (a) meets the node display criterion, and (b) is among the first set of nodes: loading first node data for the first node from the remote device storing the hierarchal data structure;

determining that a second node (a) fails to meet the node display criterion, and (b) is among the first set of nodes; and based on determining that the second node (a) fails to meet the node display criterion, and (b) is among the first set of nodes: refraining from loading second node data for the second node from the remote device.

2. The one or more non-transitory computer readable media of claim 1, wherein the node display criterion includes determining that a particular node is within a display region of a graphical user interface (GUI).

3. The one or more non-transitory computer readable media of claim 1, wherein the node display criterion includes determining that a particular node is within predetermined number of hierarchal levels from any node in a display region of a graphical user interface (GUI).

4. The one or more non-transitory computer readable media of claim 1, wherein the operations further comprise:

based on determining that the first node (a) meets the node display criterion, and (b) is among the first set of nodes: displaying the first node in a graphical user interface (GUI) of the local device; and based on determining that the second node (a) fails to meet the node display criterion, and (b) is among the first set of nodes: refraining from displaying the second node in the GUI.

5. The one or more non-transitory computer readable media of claim 1, wherein the operations further comprise:

subsequent to determining that the second node fails to meet the node display criterion: detecting a change in display data of a graphical user interface (GUI) of the local device;

based on detecting the change in the display data, determining that the second node meets the node display criterion; and based on determining that the second node (a) meets the node display criterion, and (b) is among the first set of nodes: loading the second node data for the second node from the remote device.

6. The one or more non-transitory computer readable media of claim 1, wherein the operations further comprise:

determining that a third node (a) meets the node display criterion, and (b) is not among the first set of nodes; and based on determining that the third node (a) meets the node display criterion, and (b) is not among the first set of nodes: refraining from loading third node data for the third node from the remote device.

7. The one or more non-transitory computer readable media of claim 1, wherein the operations further comprise:

storing, at the local device, a set of instructions to manage nodes states of nodes in the hierarchal data structure, wherein the set of instructions includes the first instruction and a second instruction, wherein the second instruction is to change a second set of nodes of the hierarchal data structure from the second state to the first state, wherein the second set of nodes is a subset of the first set of nodes;

determining that a third node (a) meets the node display criterion, and (b) is among the second set of nodes; and based on determining that the third node (a) meets the node display criterion, and (b) is among the second set of nodes: refraining from loading third node data for the third node from the remote device.

8. The one or more non-transitory computer readable media of claim 7, wherein the operations further comprise:

determining that the third node is among the second set of nodes without determining that the third node is among the first set of nodes at least by:

storing the set of instructions according to a hierarchal level associated with the respective instructions in the set of instructions;

in order from lowest hierarchal level to highest hierarchal level, determining if any instruction exists in the set of instructions that applies to the third node; and based on determining that the second instruction exists and applies to the third node, refraining from identifying additional instructions that apply to the third node.

9. A method comprising:

receiving, at a local device, a first instruction to change a node state of a first set of nodes in a hierarchal data structure, stored in a remote device, from a first state to a second state, wherein the first state corresponds to a non-user-selectable state and the second state corresponds to a user-selectable state;

determining that a first node (a) meets a node display criterion, and (b) is among the first set of nodes;

based on determining that the first node (a) meets the node display criterion, and (b) is among the first set of nodes: loading first node data for the first node from the remote device storing the hierarchal data structure;

determining that a second node (a) fails to meet the node display criterion, and (b) is among the first set of nodes; and based on determining that the second node (a) fails to meet the node display criterion, and (b) is among the first set of nodes: refraining from loading second node data for the second node from the remote device, wherein the method is performed by at least one device including a hardware processor.

10. The method of claim 9, wherein the node display criterion includes determining that a particular node is within a display region of a graphical user interface (GUI).

11. The method of claim 9, wherein the node display criterion includes determining that a particular node is within predetermined number of hierarchal levels from any node in a display region of a graphical user interface (GUI).

12. The method of claim 9, wherein the method further comprises:

based on determining that the first node (a) meets the node display criterion, and (b) is among the first set of nodes: displaying the first node in a graphical user interface (GUI) of the local device; and based on determining that the second node (a) fails to meet the node display criterion, and (b) is among the first set of nodes: refraining from displaying the second node in the GUI.

13. The method of claim 9, wherein the method further comprises:

subsequent to determining that the second node fails to meet the node display criterion: detecting a change in display data of a graphical user interface (GUI) of the local device;

based on detecting the change in the display data, determining that the second node meets the node display criterion; and based on determining that the second node (a) meets the node display criterion, and (b) is among the first set of nodes: loading the second node data for the second node from the remote device.

14. The method of claim 9, wherein the method further comprises:

determining that a third node (a) meets the node display criterion, and (b) is not among the first set of nodes; and based on determining that the third node (a) meets the node display criterion, and (b) is not among the first set of nodes: refraining from loading third node data for the third node from the remote device.

15. The method of claim 9, wherein the method further comprises:

storing, at the local device, a set of instructions to manage nodes states of nodes in the the hierarchal data structure, wherein the set of instructions includes the first instruction and a second instruction, wherein the second instruction is to change a second set of nodes of the hierarchal data structure from the second state to the first state, wherein the second set of nodes is a subset of the first set of nodes;

determining that a third node (a) meets the node display criterion, and (b) is among the second set of nodes; and based on determining that the third node (a) meets the node display criterion, and (b) is among the second set of nodes: refraining from loading third node data for the third node from the remote device.

16. The method of claim 15, wherein the method further comprises:

determining that the third node is among the second set of nodes without determining that the third node is among the first set of nodes at least by:

storing the set of instructions according to a hierarchal level associated with the respective instructions in the set of instructions;

in order from lowest hierarchal level to highest hierarchal level, determining if any instruction exists in the set of instructions that applies to the third node; and based on determining that the second instruction exists and applies to the third node, refraining from identifying additional instructions that apply to the third node.

17. A system comprising:

at least one device including a hardware processor;

the system being configured to perform operations comprising:

receiving, at a local device, a first instruction to change a node state of a first set of nodes in a hierarchal data structure, stored in a remote device, from a first state to a second state, wherein the first state corresponds to a non-user-selectable state and the second state corresponds to a user-selectable state;

determining that a first node (a) meets a node display criterion, and (b) is among the first set of nodes;

based on determining that the first node (a) meets the node display criterion, and (b) is among the first set of nodes: loading first node data for the first node from the remote device storing the hierarchal data structure;

determining that a second node (a) fails to meet the node display criterion, and (b) is among the first set of nodes; and based on determining that the second node (a) fails to meet the node display criterion, and (b) is among the first set of nodes: refraining from loading second node data for the second node from the remote device.

18. The system of claim 17, wherein the node display criterion includes determining that a particular node is within a display region of a graphical user interface (GUI).

19. The system of claim 17, wherein the node display criterion includes determining that a particular node is within predetermined number of hierarchal levels from any node in a display region of a graphical user interface (GUI).

20. The system of claim 17, wherein the operations further comprise:

based on determining that the first node (a) meets the node display criterion, and (b) is among the first set of nodes: displaying the first node in a graphical user interface (GUI) of the local device; and based on determining that the second node (a) fails to meet the node display criterion, and (b) is among the first set of nodes: refraining from displaying the second node in the GUI.

* * * * *